United States Patent [19]

Cargill

[11] 4,182,632

[45] Jan. 8, 1980

[54] DIFFUSER

[76] Inventor: James M. Cargill, c/o Huletts Sugar Limited, P.O. Box Mount Edgecombe, 4300 Natal, South Africa

[21] Appl. No.: 833,177

[22] Filed: Sep. 14, 1977

[30] Foreign Application Priority Data

Sep. 14, 1976 [GB] United Kingdom ............... 38018/76

[51] Int. Cl.² .......................... C13D 1/00; B01D 11/00
[52] U.S. Cl. ............................................ 127/5; 127/3; 127/6; 422/272
[58] Field of Search ............................. 127/3, 4, 5, 6, 7; 422/272

[56] References Cited

U.S. PATENT DOCUMENTS

| 2,569,199 | 9/1951 | Smet | 422/272 X |
| 3,554,799 | 1/1971 | Diaz-Compain | 127/6 |
| 3,586,535 | 6/1971 | Crawford | 127/7 |
| 3,809,538 | 5/1974 | Duchateau | 422/272 |
| 3,860,395 | 1/1975 | Kehse | 422/272 |

Primary Examiner—Sidney Marantz
Attorney, Agent, or Firm—Young & Thompson

[57] ABSTRACT

A diffuser, particularly for solvent extraction, and more particularly for the extraction of sugar from sugar cane, the diffuser comprising vertically disposed annular extracting stages, each having means to move the material being processed around each stage, each stage including an orifice for material to fall to a lower extracting stage or to a material removal stage.

1 Claim, 9 Drawing Figures

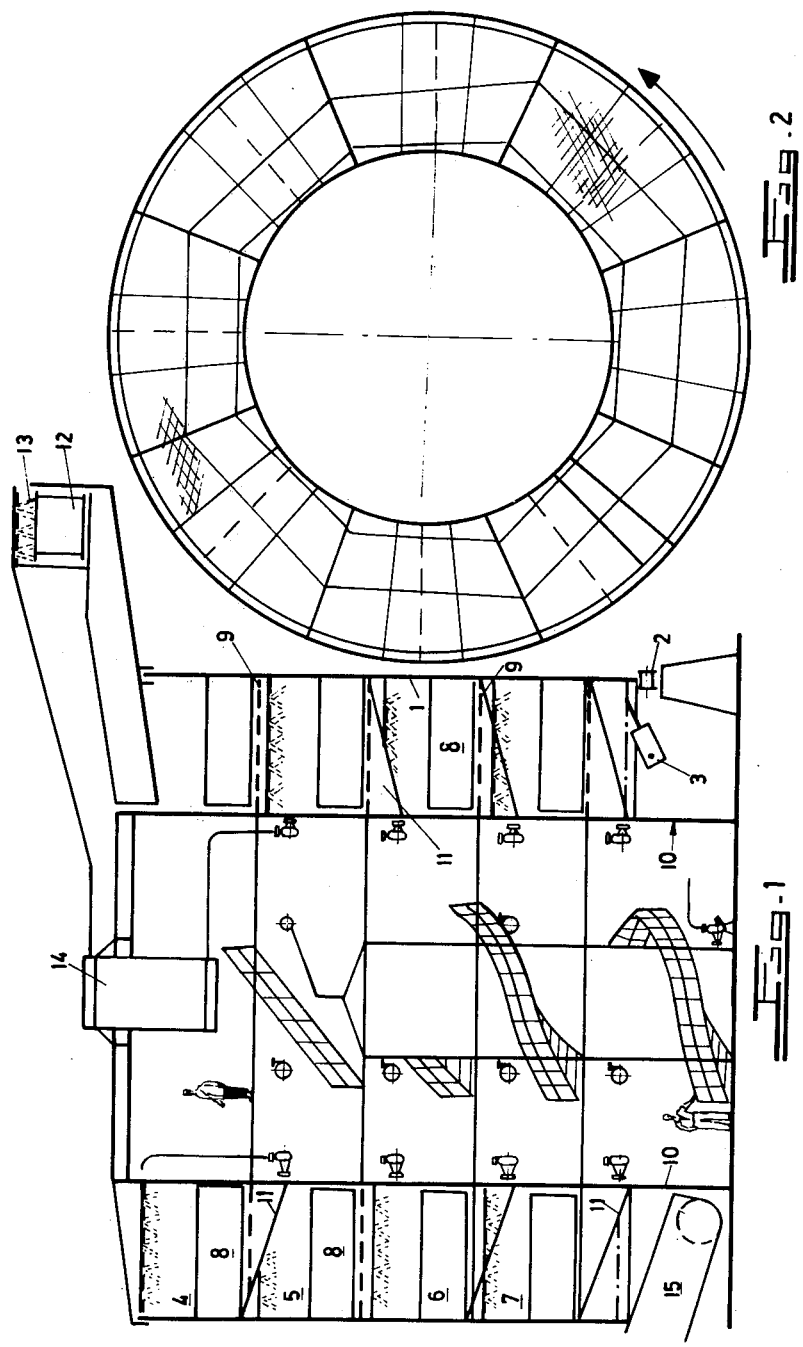

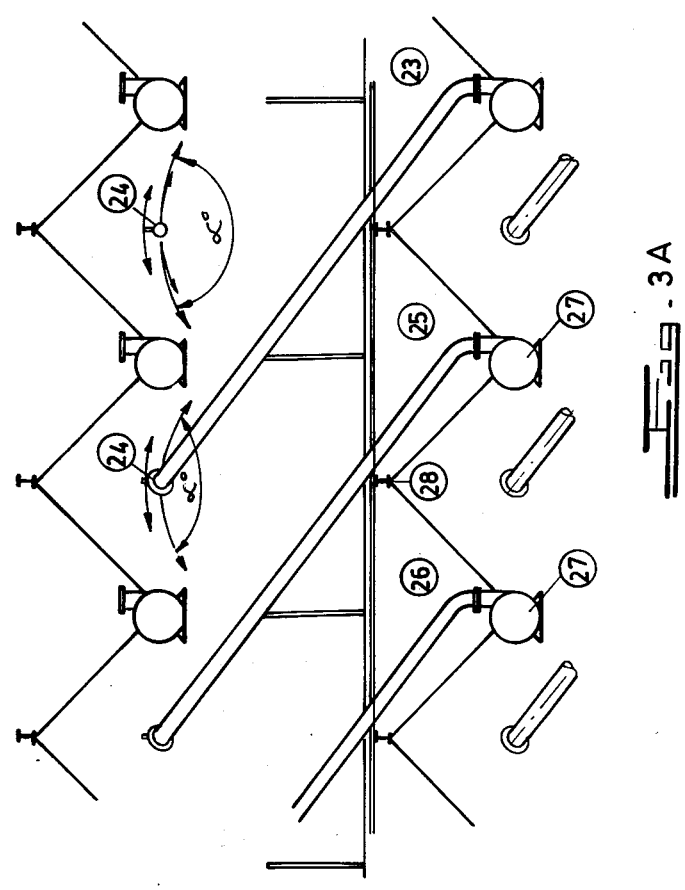

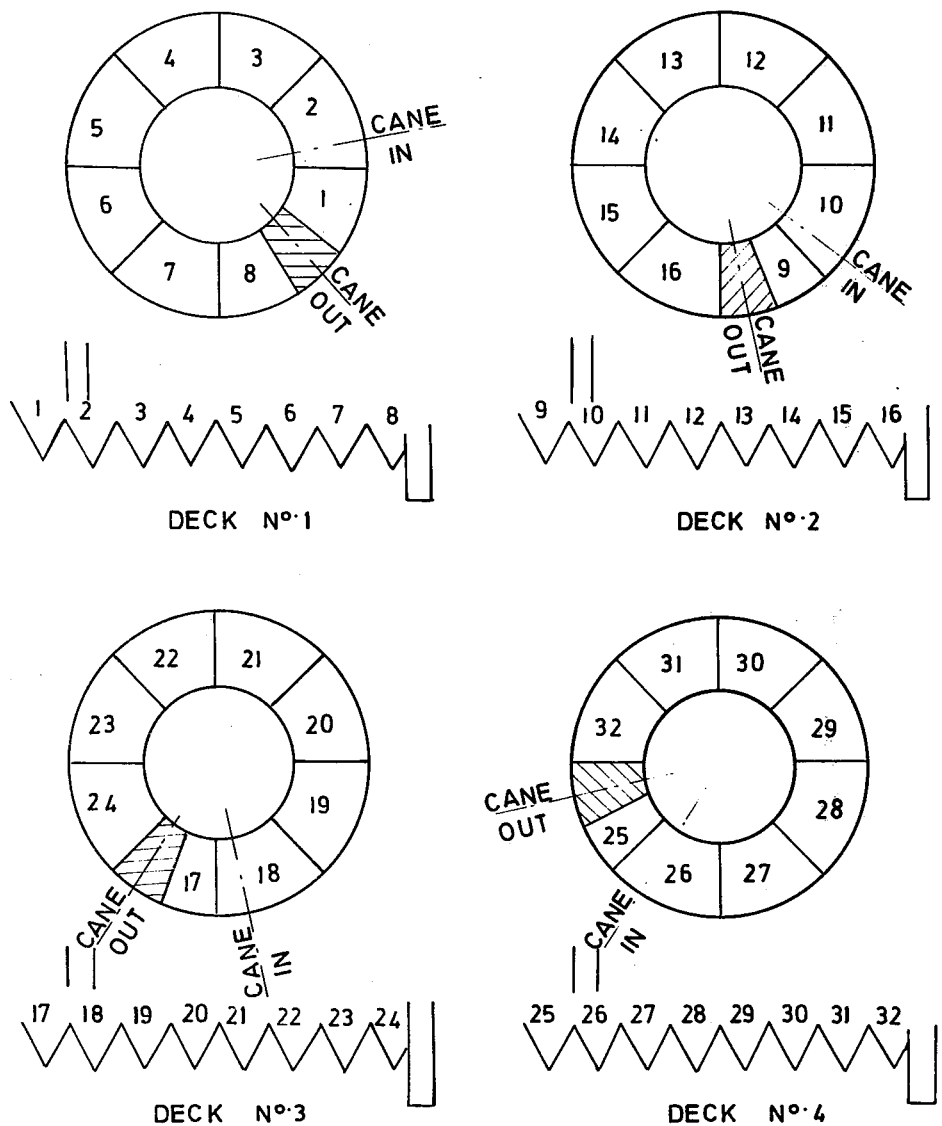

DIFFUSER

The present invention relates to a solvent extraction process and apparatus therefor.

Although this specification makes particularly reference to the extraction of sucrose from sugar cane, it must be understood that the invention also covers the extraction of any suitable soluble substances from any type of sub-divided solids containing such substances.

The extraction of sucrose from sugar cane generally comprises two major stages: firstly, a particle size reduction stage, during which the cane is prepared to a certain fineness; and secondly, the crushing and/or the diffusion or lixiviating stage. In this latter stage, the prepared cane or bagasse is conveyed and by percolation and/or countercurrent flowing of a suitable water mixture, the residual sucrose is dissolved and extracted. The present invention is directed to the second stage.

Various apparatus and methods are known to effect the diffusion stages.

It is an object of the invention to provide an apparatus for solvent extraction by means of which the movement of the prepared cane or bagasse is relatively simplified.

According to the invention there is provided diffusion apparatus comprising vertically-disposed annular extracting stages, means to move the material being processed around each stage, each stage including an orifice for material to fall to a lower extracting stage or to a material removal stage.

Each extraction stage may comprise a stationary screen and means associated with the shell of the apparatus movable thereover so as to move the material being extracted over the screen. The screen is provided with a hatch at a predetermined position for the material to fall through once it has completed a partial revolution on the screen.

In a preferred form of the invention the outside of the shell of the apparatus is supported on rollers or the like and is suitably rotationally driven. The means to move the material may take the form of radial members associated with the rotating cylindrical outer shell of the apparatus and being adapted to move over the screen.

It is preferred that a number of extracting stages are provided and a recirculating percolation system is provided for counter-current extraction.

The apparatus may include a fixed central cylindrical column with stationary perforated screening decks located at various levels above liquid collecting trays which are also attached to the fixed central column. The screens and trays are in an annulus defined by the central column and the outer shell of the apparatus, to the latter of which are attached the radial members.

The screens have their hatches arranged for the material to be dropped on to the next lower screen at a position remote from its hatch so that the material travels almost a full revolution at each stage.

The radial members may have a grid structure between them to strengthen the system.

The invention will now be described by way of example with reference to the accompanying diagrammatic drawings of which:

FIG. 1 shows a sectional side view of a diffuser apparatus;

FIG. 2 shows a plan view of the juice trays;

FIG. 3A is a diagrammatic elevational view of the juice spray control system.

FIG. 4 is a plan diagram of the juice trays of a 4 deck diffuser with thirty-two juice trays;

Figure 3:
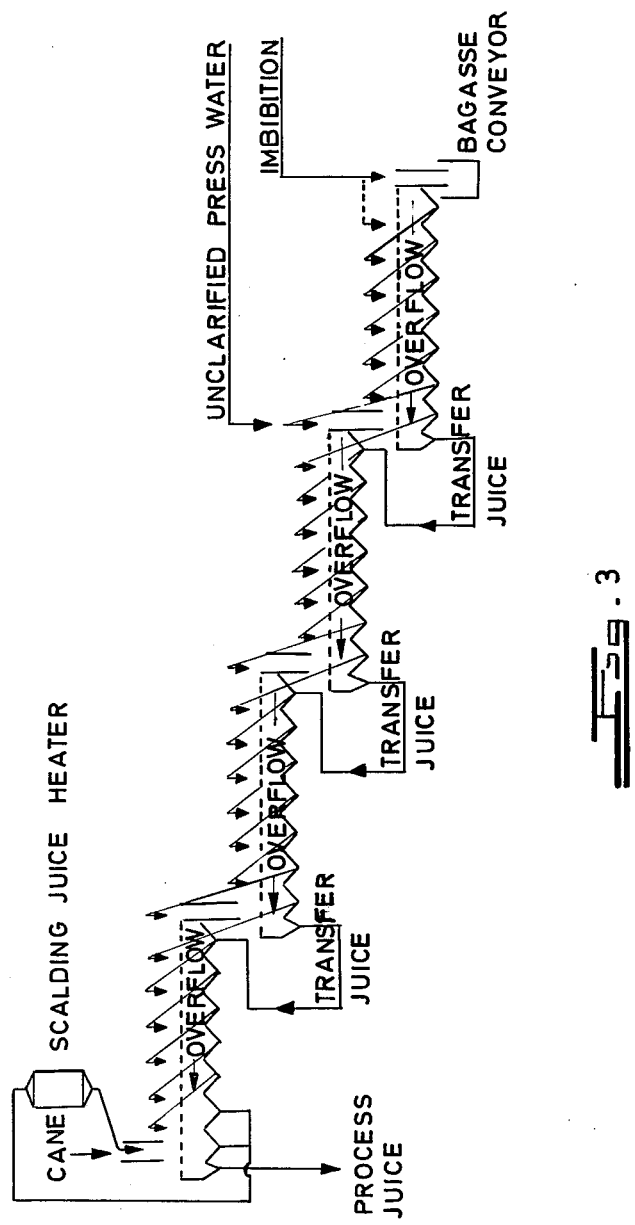
FIG. 3 shows a diagram of juice flows on a 4 deck diffuser.
Figure 5:
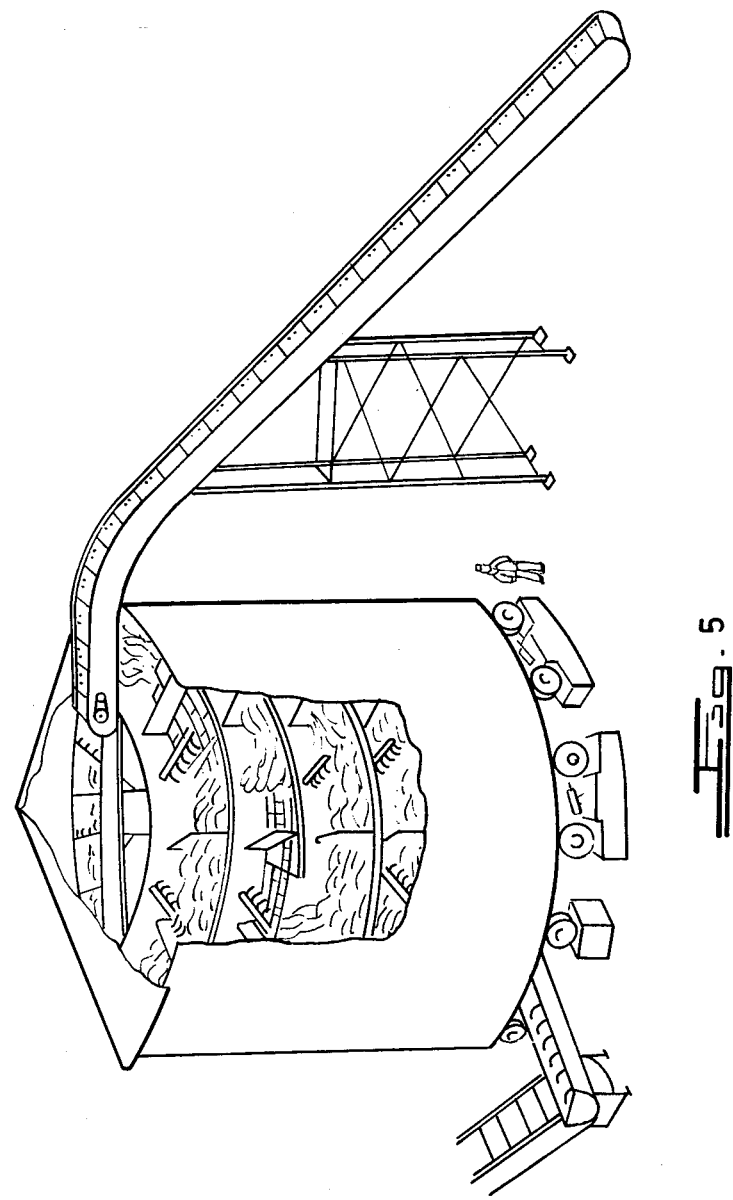
FIG. 5 is a perspective cut-away view of a multi-deck diffuser for illustrative purposes.

Referring to FIG. 1, the diffuser consists of an outer cylindrical shell, 1, supported around its bottom perimeter on rollers, 2. The outer shell, 1, is slowly rotated by sets of hydraulic rams, 3, which act against evenly spaced pins or chain pins, not shown, attached to the bottom perimeter of shell 1.

The shell 1 is divided into vertical stages 4, 5, 6 and 7. Each stage has plate arms 8 attached vertically to shell 1 and radiating inwards to the centreline of the diffuser. The plate arms form compartments and convey the cane or bagasse across the screen deck 9.

A fixed inner column or core 10 provides the support to the screen deck 9 together with juice collection tray 11.

The fixed inner column or core 10 is divided into vertical stages 4, 5, 6 and 7 so that fixed inner and rotating outer members form a complete stage.

Although FIG. 1 shows four such stages the diffuser could consist of one or more stages depending on the capacity and degree of soluble removal required.

Although not shown in FIG. 1, each screen deck 9, together with their supporting juice trays 11, has a segment removed to form a hatch through which material can fall from one level to the next lower level.

Prepared cane, or bagasse, is fed into the top stage by a conveyor 12. The prepared cane is heated by scalding juice from sprays 13. The scalding juice is heated in a heater 14. The scalding juice is collected in the trays under the fixed screens at the cane or bagasse inlet and recirculated over the incoming cane or bagasse for a portion of the circuit around the first deck level.

After completing a circuit of the upper deck the cane or bagasse falls through the hatch to the next lower level and makes another circuit until it reaches the discharge hatch, through which it falls to the next lower deck, and so on until it reaches a bagasse discharge conveyor 15.

The cane and juice flow is diagrammatically represented in FIG. 3. The points at which juice is extracted from a juice tray compartment and pumped counter-current to the flow of bagasse is illustrative only and can be varied according to the permeability of the bagasse mat and amount of stage recirculation required.

FIG. 3A shows a vertical cross-section through a typical stage, indicating the means whereby juice is pumped from a juice tray under the fixed screen deck and sprayed onto the moving bagasse mat in a counter-flow fashion. The sprayed juice percolates down through the bagasse mat, through the screen and into the juice trays to be pumped again in a counter-current manner. The porosity of the bagasse mat affects the time taken for the juice to percolate down through the moving bagasse mat and thus the point to exit of the juice through the screen deck into the trays. It may be preferable to have some means of adjusting the point of application of the juice sprays so that the desired exit point of the juice from the bagasse mat is obtained.

Referring to FIG. 3A, this may be accomplished as follows:

Juice may be pumped from juice tray A by pump B through pipe C to spray distribution D onto the moving bagasse mat. The spray distribution D may be adjustable in such a manner that the spray can operate in any position through angle OC. This means that the point of application of the spray can be varied relative to tray A and thus percolating juice can be controlled to return to tray A (full recirculation), partly to tray A and partly to tray E (partial recirculation), or to trays E & F (no recirculation), as desired.

The advantages of the invention are seen to be as follows:

a. Construction is mainly simple platework and relatively inexpensive.

b. There are no chains, or expensive chain driving systems necessary to transport the cane within the diffuser.

c. By attaching arms to the outer shell and rotating the shell on rollers the force applied to produce the rotational torque is applied at a point of maximum leverage thereby reducing the force required. The rotation may be applied by synchronised hydraulic rams to obtain a steplessly variable rotational speed inexpensively.

d. No heavy chains or scrapers rest on the screens thereby reducing the torque required for rotation and reducing the wear to stationary members caused by chain transporting systems.

e. Each stage is unitised consisting of a fixed inner column fitted with screens, trays and pumps, and an outer shell with attached arms. The design lends itself to easy transportation and erection, and additional cells can be added later without major alterations.

f. It is suitable for outdoor operation and is totally enclosed g. It does not occupy as much floor space as existing diffusers of the same capacity, or screen area.

h. There is only one major moving part in the diffuser, apart from pumps, and that is the slowly rotating outer shell.

i. The bagasse mat is reformed after every transfer from one level to another avoiding the formation of impervious layers which may resist percolation of juice flow through the mat.

j. The plate arms form compartments within each stage which prevent juice within the mat from flowing in an uncontrolled manner horizontally through the bed.

k. The plate arms also mean that the diffuser can operate satisfactorily in a flooded conditions (the conditions of maximum percolation) with ill effect.

I claim:

1. Diffusion apparatus comprising vertically disposed stationary screens about a fixed central cylindrical column, liquid collecting trays located below the screens, the trays being attached to the central column, the screens and trays being located in an annulus defined by the central column and the outer shell of the apparatus, said shell being rotatable, and radial members being attached to the outer shell and being arranged to move the material being treated over the screens.

* * * * *